P. J. FISH, Sr.
NESTED DIES FOR FORMING BODIES FROM PLASTIC MATERIALS.
APPLICATION FILED APR. 6, 1908.

938,047.

Patented Oct. 26, 1909.
2 SHEETS—SHEET 1.

Witnesses:
H. W. Steindorf
Brennan B. West

Inventor.
Perry J. Fish Sr.
per Bair, Freele Hall
Attorneys.

P. J. FISH, Sr.
NESTED DIES FOR FORMING BODIES FROM PLASTIC MATERIALS.
APPLICATION FILED APR. 6, 1908.

938,047.

Patented Oct. 26, 1909.
2 SHEETS—SHEET 2.

Witnesses:
H. W. Steindorf
Brennan B. West

Inventor
Perry J. Fish Sr.
per Bates, Fouts & Hull
Attorney

UNITED STATES PATENT OFFICE.

PERRY J. FISH, SR., OF KENMORE, OHIO, ASSIGNOR OF ONE-HALF TO WARREN OVERPACK, OF LEHIGH, IOWA.

NESTED DIES FOR FORMING BODIES FROM PLASTIC MATERIALS.

938,047.  Specification of Letters Patent.  Patented Oct. 26, 1909.

Application filed April 6, 1908. Serial No. 425,346.

*To all whom it may concern:*

Be it known that I, PERRY J. FISH, Sr., a citizen of the United States, residing at Kenmore, in the county of Summit and State of Ohio, have invented a certain new and useful Improvement in Nested Dies for Forming Bodies from Plastic Materials, of which the following is a full, clear, and exact description, reference being had to the accompanying drawings.

This invention relates to machines for forming hollow tubular bodies, and it has particular reference to the dies that are used in such machines; the invention having for its object the production of a plurality of such bodies simultaneously, thereby effecting a great saving of labor and time in the production of the same. This object I attain by nesting the dies in the manner hereinafter described, and by forcing the plastic material through all of said dies simultaneously.

Figure 1:
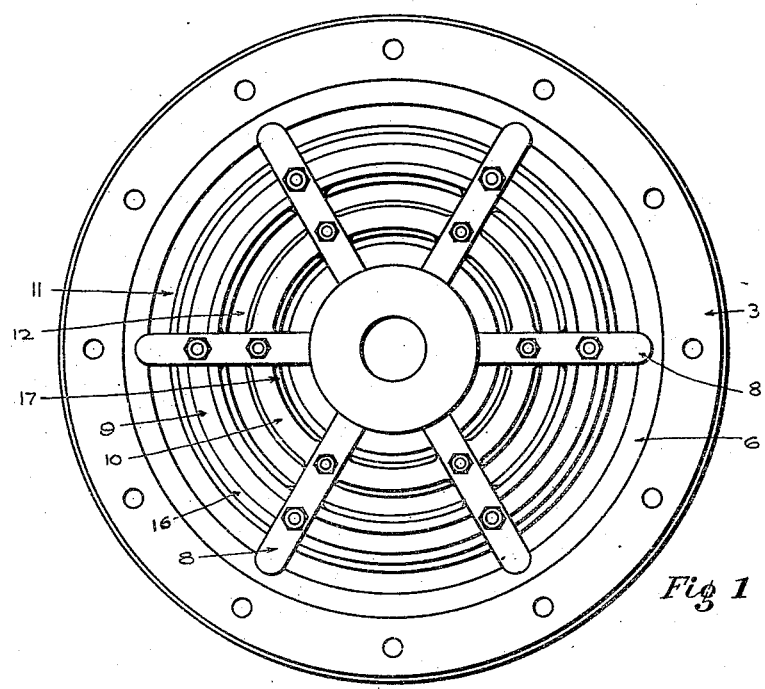
Figure 2:
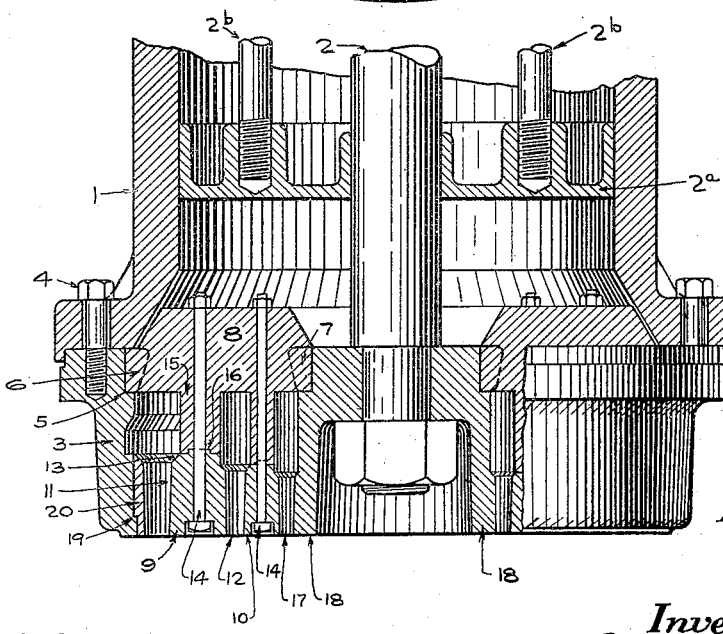
Figure 5:
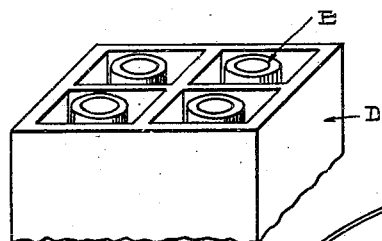
Figure 6:
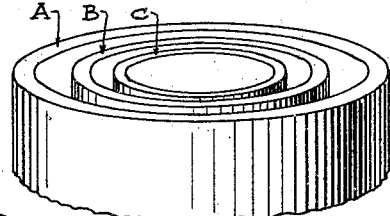
Figure 3:
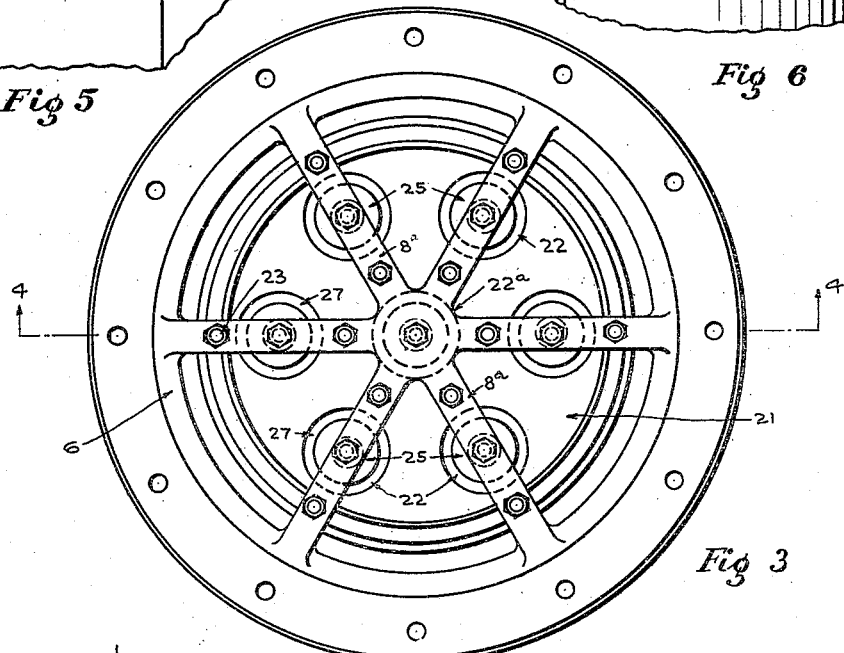
Figure 4:
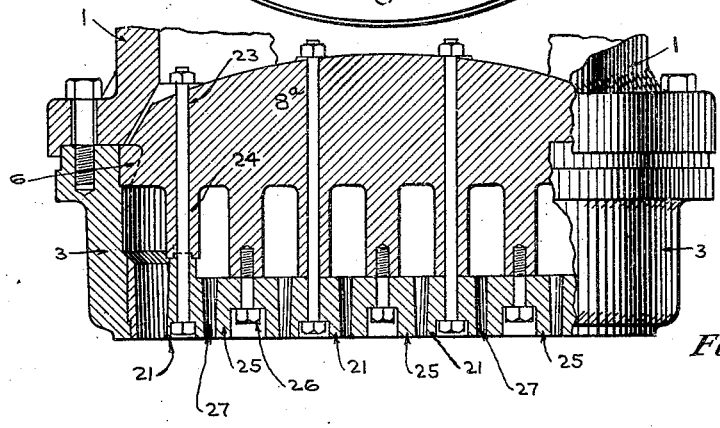

In the drawings forming a part of this application, Figure 1 is a plan view of one form of the nested dies constituting my invention; Fig. 2 is a side view, partly in section and partly in elevation of the die shown in Fig. 1, said view also showing portions of the machine to which the dies are attached; Fig. 3 is a plan view of a modified form of nested dies; Fig. 4 is a side view, partly in section and partly in elevation, of the dies shown in Fig. 3, the section being taken on line 4—4 of that figure, and Figs. 5 and 6 are perspective views showing forms of tubular bodies made by the dies and the relation of said bodies to each other as they are formed in said dies.

Taking up a more specific description of the invention by reference to the drawings, in which the same reference characters designate the same parts throughout the several views, 1 represents the cylinder of a machine to which the dies are attached, which machine may be of any type for compressing the plastic material and forcing the same through the dies.

2 is the center rod which, in certain forms of my invention, may be employed to assist in supporting the dies. It will be understood, however, that the dies may be supported in any suitable manner and that my invention is not limited to any particular manner for supporting these parts. Different means may also be employed for forcing the plastic material through the dies, that shown consisting of a piston $2^a$ within the cylinder and surrounding the center rod, the piston being operated by piston rods $2^b$.

In the form of dies that are shown in Figs. 1 and 2, 3 is the outside part of the dies, said part being shown as round or annular, although the same may be of any desired contour. The part 3 is attached to the cylinder 1 in any suitable manner, as by bolts 4. On the interior of the part 3 I provide a shoulder 5 upon which rests the outer rim 6 of the bridge, said bridge being provided with a central ring 7 and with radial arms 8 that connect said ring with the outer rim. This bridge may likewise vary in form according to the nature of the product to be formed by the dies.

Supported from the arms 8 and concentric with the outer part 3 of the die, are inner die members 9 and 10, member 9 being spaced from the part 3 to form a passage 11, and the members 9 and 10 being spaced apart to form a passage 12. As shown, the opposite faces of the members 9 and 10 are slightly widened at the bottom in order that the spaces 11 and 12 may be slightly constricted so as to compress the material tightly as the same is forced through the passages. The upper edges of said die members are also beveled, as shown at 13, for the purpose of feeding the material into said passages. The members 9 and 10 are secured to the arms 8 of the bridge by bolts 14, which are passed upwardly through said members and said arms, the members being spaced from the bridge by means of tubular sleeves 15. These sleeves 15 may be formed integral with the bridge arms, as shown, or may be a part of the die members, or they could be formed of entirely separate pieces and simply used as spacers. In order to properly center the die members with respect to the sleeves 15, I provide on the upper surface of said members an annular projection or dowel 16 which extends into a recess in said sleeves, although the sleeves may carry the dowels and the members have the recesses, if preferred.

Within the die member 10, and spaced therefrom by a passage 17, is the core die 18, said die, in the instance shown, being somewhat of the shape of an inverted cup with a central aperture in its upper part, through which projects the center rod 2, by means of which rod the core die is held in proper position. The upper surface of the core die is also grooved or rabbeted at its upper edges to receive the ring 7 of the bridge and thus assist in supporting the latter, it being understood that the upper end of the rod 2 is secured to the upper framework of the machine.

The outer part 3 of the die has an internal annular shoulder at 19, for supporting a bushing 20, which forms a lining for one side of the passage 11. While the same are not shown in the drawings, it will be understood that the die members 9 and 10 and the core die may likewise be provided with such bushings, a wearing surface being thus provided on each side of all of the passages. It is not necessary, however, that any bushings be used, the one shown being to illustrate the use of such bushings with my invention.

In the form shown in Figs. 3 and 4, a different arrangement of inner dies is shown, by which I am enabled to form an outer tubular body and a plurality of inner smaller tubular bodies, the latter bodies being spaced apart and arranged non-concentric with respect to each other. In said figures, 1 represents the cylinder to which the dies are attached, and 3 represents the outer part of the die, as before, which part 3 may be of the same shape as the part 3 shown in Fig. 2. 6 represents the outer rim of the bridge and 8$^a$ the radial arms of the latter. Instead of using a plurality of concentric inner die members, however, I use a die plate 21, said plate being provided with spaced apertures 22 forming the outer surface of the dies for the small tubular bodies. As shown, six of the apertures 22 are arranged in a circle about the center of the plate, and a similar aperture 22$^a$ is placed at the center of said plate. The plate 21 is supported from the bridge by means of bolts 23 which pass upwardly through the plates and through the bridge arms, the plate being spaced from the bridge a suitable distance by extensions 24 similar to the extensions 15 hereinbefore described. Likewise supported from extensions on the bridge, and arranged concentrically within the apertures 22, are core dies 25, said dies being attached to the extensions of the bridge arms by suitable bolts 26. The core dies 25 are spaced from the outer walls of the apertures 22 so as to form inner passages 27 through which the plastic material may be forced for forming the smaller bodies.

In Figs. 5 and 6 I have shown the tubular bodies which may be produced by the dies when arranged in accordance with my invention; Fig. 6 showing a series of concentric bodies such as are formed with the dies shown in Figs. 1 and 2, the outer body A having been forced through the passage 11 and the inner bodies B and C having been forced through the passages 12 and 17, respectively. Fig. 5 shows an arrangement of tubular bodies similar to those produced by the dies shown in Figs. 3 and 4, except that the outer body D is rectangular in form and is divided into four rectangular parts by transverse partitions, in each of which four parts is a smaller tubular body E.

It will be understood that suitable bat boards or pallets, not shown, will be provided for supporting the bodies during the cutting operation and during the subsequent handling.

The advantages of my invention may be summed up as follows: A plurality of separate and independent tubular bodies can be formed at one and the same time and by the same operation, the said bodies being nested inside of one another, and can be carried away on one bat board or pallet, the same as if one larger body were formed alone. Less time, labor and expense is therefore required for producing the various sizes of bodies than would be required if but a single body were formed at one time, less labor is required in tucking away the bodies and a smaller dry room will suffice owing to the nested condition of the said bodies.

By the term tubular body as herein employed, I mean to refer to any sort of tubular article which is formed of plastic material; and, by plastic material, I mean any sort of material that is of such nature that it may be compressed and formed into tubular bodies by being forced through the dies.

While the invention is particularly adapted to the manufacture of tile and similar articles of clay, it will be seen that the same is not limited to this use, and the following claims are not intended to be so limited any further than is rendered necessary by the specific terms therein employed.

Having thus described my invention, I claim:

1. In a machine for making tubular bodies from plastic material, an outer die member for forming the outer surface of a relatively large tubular body, a second die member, a third die member, the second die member forming the inner surface of the large tubular body and the outer surface of the second tubular body, and the third die member forming the inner surface of the said second tubular body, a bridge having an outer rim that is supported upon the outer die member, and a plurality of radial arms extending from said rim, means connecting the second die member with said arms, means for supporting the said second die member from the arms, and mechanism for forcing the plastic material between the said die members whereby separate and independent bodies are simultaneously produced.

2. In a machine for making tubular bodies from plastic material, a container for said material, means for forcing the said material from the container, an outer die member secured to the container, said die member having an internal annular shoulder, a bridge having an outer annular rim resting upon the shoulder of the outer die member and having a series of radiating arms, inner die members arranged concentrically with respect to the outer die member, means for supporting the inner die members from the said radial arms of the bridge, a central core, and means independent of the bridge for supporting said core, the core having an outer shoulder near its upper side upon which the inner part of the bridge rests, whereby the bridge is supported from the outer die member and from the central core.

3. In a machine for making tubular bodies from plastic material, the combination with a container for the plastic material, of means for forcing said material from the container, an outer annular die member secured to the container, an inner core, means for supporting said inner core concentrically with respect to the outer die member, said core and die member each being provided with an annular shoulder, a bridge supported upon said shoulders, a plurality of die members arranged concentrically with respect to the outer die member and the central core, and means for supporting the inner die members from the said bridge.

4. In a machine for making tubular bodies from plastic material, the combination with a container for the plastic material, of means for forcing said material from the container, an annular outer die member secured to the container, a central core, means for supporting said core centrally with respect to the outer die member, said outer die member and core each being provided with an annular shoulder, a bridge having an outer ring resting upon the shoulder of the outer die member and an inner ring resting upon the shoulder of the central core with radial arms connecting the said rings of the bridge, said arms having downwardly projecting tubular extensions, inner die members secured to said extensions, said inner die members being arranged concentrically with respect to each other and with respect to the outer die member and the central core, and bushings lining the inner faces of the die members.

5. In a machine for making tubular bodies from plastic material, the combination with a container for the plastic material, of means for forcing said material from the container, an annular outer die member secured to the container, a central core, means for supporting said core centrally with respect to the outer die member, said outer die member and core each being provided with an annular shoulder, a bridge having an outer ring resting upon the shoulder of the outer die member and an inner ring resting upon the shoulder of the central core with radial arms connecting the said rings of the bridge, said arms having downwardly projecting tubular extensions, inner die members secured to said extensions, said inner die members being arranged concentrically with respect to each other and with respect to the outer die member and the central core, an annular projection on each of the inner die members fitting into corresponding recesses in the tubular projections for properly spacing the die members, and bushings lining the inner faces of the die members.

6. A machine for making tubular bodies from plastic material, the combination with a container for the plastic material, means for forcing the said material from the container, of an outer die member secured to the container, said die member being provided with an internal shoulder, a bridge having an outer ring which rests upon the annular shoulder upon the die, said bridge being provided with a series of radiating arms, inner die members arranged coaxially with the outer die member, means for supporting the inner die members from the said radial arms of the bridge, a central core, and means independent of the bridge for supporting the core.

In testimony whereof, I hereunto affix my signature in the presence of two witnesses.

PERRY J. FISH, Sr.

Witnesses:
S. E. Fouts,
A. J. Hudson.